Patented Jan. 24, 1950

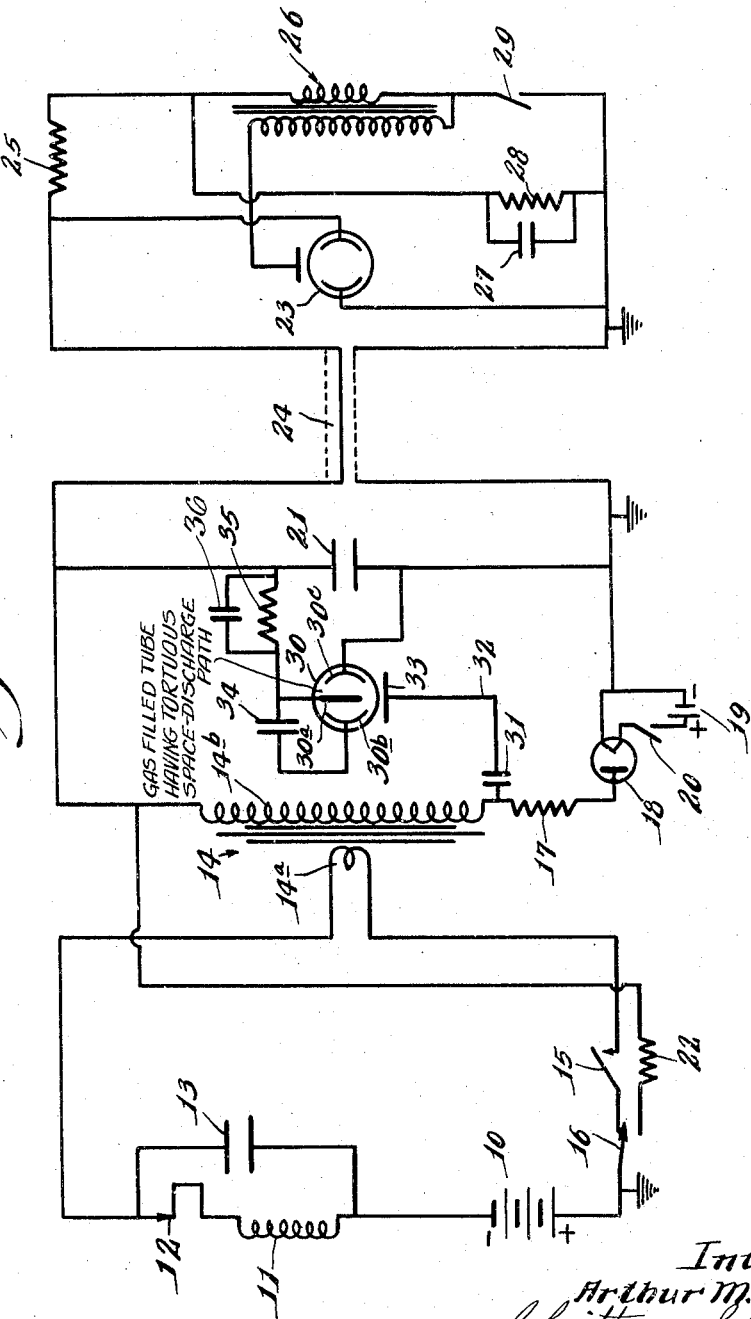

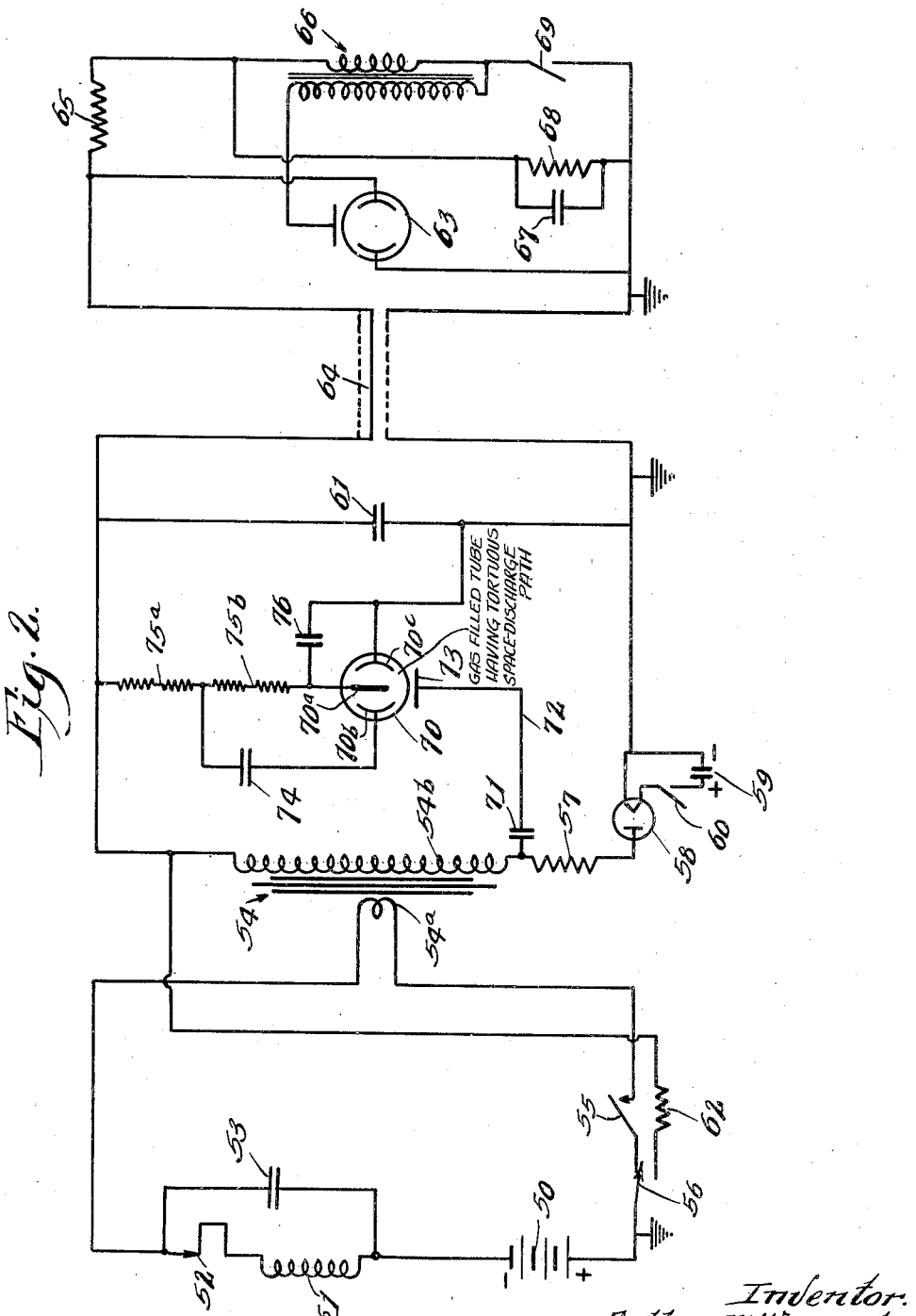

2,495,301

UNITED STATES PATENT OFFICE 2,495,301

VOLTAGE REGULATOR, PARTICULARLY FOR FLASH EQUIPMENT FOR PHOTOGRAPHY

Arthur M. Wengel, Blooming Grove, Wis., assignor to Ray-O-Vac Company, a corporation of Wisconsin Application October 9, 1947, Serial No. 778,853

15 Claims. (Cl. 315—206)

1

This invention relates to a voltage regulator, and more particularly to a voltage regulator adapted for use in flash equipment for photography.

This application is a continuation in part of my copending application for a "Voltage regulator, particularly for flash equipment for photography," filed January 22, 1947, as Serial No. 723,494, now abandoned.

There has been developed in recent years flash equipment for photography wherein the flash bulb is not entirely expended after one operation, but may be used throughout a great number of flash operations. Flash bulbs of this long lasting type often comprise a tube filled with an inert gas, as for example, krypton or xenon, and these bulbs usually require a source of high voltage for their operation. In order to provide this high voltage a storage condenser may be used in the conventional manner, and this condenser may be charged from a low original source of voltage by means of a step-up transformer or by other means well known to the art.

In utilizing this type of equipment it has heretofore been known to use a relatively inexhaustible supply of current for the original voltage source, as for example conventional commercial 60 cycle 110 volt alternating current. Obviously the use of this current embodies limitations on the portability of the equipment, since the equipment is only usable when there is such a source of current available.

It has also been known to use storage batteries, as for example, conventional automobile lead-acid type batteries, as the original source of voltage, and to convert the direct current from the battery into a pulsating current by means of a vibrator or other means, and then to step-up the battery voltage to desired values by means of a transformer or other means. Several disadvantages are inherent in such a system, for in the first place the storage batteries used are heavy and bulky and provide limitations on the portability of the equipment. Also the source of current obtainable from such a battery is not inexhaustible and it has been necessary frequently to charge the batteries, thereby entailing the use of additional apparatus. Furthermore such batteries have not been completely reliable even over short periods of use, for the voltage step-up required is so great that a very small variation in the output voltage of the battery may result in a very great variation in the voltage applied to the flash bulb, thereby resulting in unreliable and unstable operation of the flash equipment.

2

It has long been apparent that the use of dry cell batteries as the original source of voltage in such equipment would be desirable because of the relative compactness, lightness and cheapness of dry cell batteries, but prior to my invention the use of such dry cells in practical photographic work, as for example use by a press photographer, has not been feasible because as pointed out above, even a very small change in the battery voltage resulted in a great change of voltage being applied to the flash bulb. For example, in one practical photographic flash device wherein the original 6 volt battery voltage is stepped up to approximately 2800 volts to apply to the flash bulb, a .1 volt change in the battery results in a 50 volt change across the storage condenser which acts as the power source for the flash bulb, so that any appreciable voltage change in the battery results in very unreliable and unstable operation of the flash equipment.

Prior to my invention no voltage regulating apparatus has been known which would satisfactorily regulate the voltage across the storage condenser despite even slight variations in the voltage of the battery or other original voltage source, and for this reason previous portable flashers have used storage batteries despite the inefficiency and inconvenience occasioned by their use. Ordinarily voltage regulating tubes or glow lamps are not capable of operating under the high voltage conditions found in the circuits utilized in such flashers where the voltage may approach 3,000 volts. While the thyraton type of tube might be utilized to provide such voltage regulation, prior to my invention these tubes have not been used because the high voltages involved require that a special high voltage tube be developed, of undesirable size, and furthermore when using such a tube it is necessary to heat or otherwise energize a filament, thereby causing an additional drain on the battery or other source of current.

I have developed and am here disclosing and claiming voltage regulating apparatus particularly adapted for use in flash equipment for photography, this apparatus permitting the use of ordinary dry cells, as for example a pair of 6 volt conventional electric lantern batteries connected in parallel, or flashlight cells so connected as to provide 6 volts (preferably eight cells in series-parallel) as the original source of voltage. My apparatus has given satisfactory results with such batteries for as long as nine hours of continuous operation, at which time the voltage of the battery dropped from 6 to 3.6 volts.

Photographic flashers equipped with my improved voltage regulator are, therefore, in addition to being truly portable without the limitations imposed by a heavy and bulky storage battery or the necessity of having a commercial source of current available, capable of greatly improved and more efficient operation over any similar equipment heretofore known.

Other features of my invention will be apparent from the following detailed description and from the drawings in which:

Fig. 1 is a schematic diagram of photographic flash equipment including one form of my invention; and Fig. 2 is a schematic diagram of photographic flash equipment including another form of my invention.

Referring to Fig. 1, an original source of voltage is illustrated as a battery 10, which may be a pair of conventional 6 volt electric lantern dry cells connected in parallel. One terminal of this source of voltage is connected to ground and the other terminal is connected through a vibrator which is adapted to convert the direct current from the battery into a pulsating current so that the voltage of the battery may be stepped up to a desired value. This vibrator comprises an inductance or operating coil 11, a switch 12 which may be of the vibrating reed type, and a condenser 13 connected across the inductance and the switch. As a result of the periodic opening and closing of the switch 12 the direct current from the battery is converted into a unidirectional pulsing current which flows through the primary 14a of a transformer 14 when a switch 15 is closed and a safety switch 16 is in the position illustrated in the drawing.

The pulsating direct current flowing through the primary 14a is stepped up to a desired high voltage and converted into alternating current in the secondary 14b of the transformer, in one practical apparatus which I have constructed the step up ratio of this transformer being approximately 470 to 1 so that the voltage in the secondary circuit is approximately 2800 volts when the voltage of the battery 10 is 6 volts. The high voltage circuit includes in series a limiting resistor 17 which may have a value of 10,000 ohms and a rectifier which is here illustrated as a diode 18 which may be of tube type No. 1654 and has its plate connected to the high voltage side of the circuit and its cathode connected to ground. Heater voltage for this diode is furnished from a source 19 which may comprise a 1.5 volt conventional flash light cell, the voltage from this cell being selectively applied to the filament of the tube by means of a switch 20. It will be understood, of course, that a cold cathode or other suitable rectifier may be used. The circuit also includes an impedance across which desired voltage may be developed. While any desired impedance across which a voltage may be developed for charging the storage condenser may be used, as a resistance or an inductance, in the photographic flash apparatus illustrated the other end of the transformer secondary is shown as being connected directly to one plate of a storage condenser 21, and the other plate of this condenser is connected to ground. This condenser may have a capacity of 25 microfarads, and should have a voltage rating in excess of the highest voltage applied across it, as for example, a rating of at least 3,000 volts in the example mentioned heretofore.

In order to guard the safety of operating personnel, one terminal of the safety switch 16 is connected to the high voltage side of the transformer secondary and the storage condenser through a resistor 22 which may have a value of 5,000 ohms, and it will be readily seen that when this switch 16 is thrown to the position other than that shown in the drawing (which may be effected automatically by movement of the lid of the case for the unit, or the like) the circuit of the battery 10 will be opened and any charge on the condenser 21 will rapidly leak off to ground through the resistor 22.

The storage condenser 21 acts as a source of voltage for the flash lamp 23 which may be of the continuously usable type having an inert gas therein as, for example, krypton or xenon. A connection is made from the high voltage side of the condenser 21 to the lamp circuit through a cable 24, it being understood that this cable may be of any desired length.

The flash bulb 23 has its own circuit associated with it, and since this circuit is known to the art it will be only briefly described here as comprising a resistor 25 which may have a value of 45 megohms, a transformer 26, a resistance-capacity network comprising a condenser 27 which may have a capacity of .5 microfarad and a voltage rating of 600 volts and resistor 28 connected in parallel therewith, this resistor having a value of 5 megohms. A switch 29 which may be of the push button type, or of a conventional type snap switch, is closed when it is desired to flash the bulb, and the bulb and circuit arrangements are such that when the circuit is closed the condenser 21 rapidly discharges through the lamp, and a flash lasting approximately 1/10,000 of a second occurs. During this flash period approximately 500 kilovolt amperes of energy are utilized, and the voltage across the condenser 21 drops to about 200 or 300 volts above ground, from which point the condenser again begins to charge.

I have devised a voltage regulating circuit which is particularly adapted to be utilized with photographic flash equipment, and which is capable of maintaining the voltage across the condenser 21 constant within close limits despite relatively great variations in the original voltage from the battery 10. My new voltage regulator comprises novel circuit arrangements associated with a tube connected in shunt with the impedance 21, said tube being arranged to pass current whenever a predetermined desired voltage is developed across said impedance, said circuit arrangements providing a means for cutting off said current flow very shortly after its initiation. The tube illustrated in the drawing at 30 may comprise a conventional so-called "Amglo" cold light lamp such for example as "Amglo" lamp type No. 76C4R. These tubes are manufactured by Amglo Corporation and since they are commercially obtainable, their structure will not be described in detail here, reference being had to patents issued to Andrew F. Henninger, Jr., and George D. Henninger, in particular U. S. Patent No. 2,217,315 issued October 8, 1940, U. S. Patent No. 2,273,520 issued February 17, 1942, and U. S. Patent No. 2,281,579 issued May 5, 1942.

Briefly, the tube is of the cold cathode type and comprises an envelope containing a gas such as mercury. Within the tube are at least two electrodes, the tube illustrated in the drawing having an anode 30a and cathode electrodes 30b and 30c, and a distinguishing characteristic of this tube is that means are provided within the tube for causing any space current flowing between two electrodes to follow a path very substantially longer than the straight line distance between said electrodes. This path may be defined by a tortuous tube of glass or other insulating material surrounding the anode and being coiled in such manner that the discharge, which follows the tube in its path between anode and cathode, traverses a distance substantially longer than the straight line distance between said electrodes.

Such tubes were devised and have been formerly used only as flasher lamps to provide a source of light such as might be utilized in traffic lights or buoy markers. However, by modifying the circuit connections to such a tube in the manner hereafter described and by arranging circuit components so that the tube is connected in a circuit operating somewhat in the manner of a relaxation oscillator I have devised a very efficient voltage regulator adapted to regulate within close limits the high voltage required in photographic flash apparatus, and to maintain close regulation in the event the original source of voltage varies to a considerable extent.

The modification above referred to consists in connecting the tube in the circuit in such manner that the positive terminal of the high voltage supply is connected to a cathode of the tube, while the negative terminal of said voltage supply is connected to the anode of the tube, thus utilizing the inverse voltage characteristics of the tube. The tube itself may also be modified by providing a low value capacity connection between the circuit including the transformer secondary 14b and the tube 30, thus stabilizing the operation of the tube and providing an ionizing effect on the gas within the tube. This connection is illustrated in Fig. 1 as comprising a condenser 31, a lead 32 and a member 33. Actually I have found that as a practical matter it is not necessary to utilize an actual physical condenser, but instead I use No. 18 or 20 insulated braided wire for the lead 32 and wind a few turns of this wire around an element in the high voltage circuit to provide a desired low capacitance. While the lead may be wrapped around a portion of the transformer secondary 14b, or may be even wrapped around one of the wire leads in the circuit having a voltage differential with respect to one of the electrodes in the tube 30, I have found it preferable to wrap from one to six turns (normally three or four turns) of the wire 32 around the resistor 17 to provide one portion of the capacity connection. The other end of the lead 32 terminates in a conducting member located closely adjacent one of the electrodes in the tube. While it will be obvious that other arrangements may be employed I have obtained satisfactory results by attaching the lead 32 to the member 33 which may be a washer cemented on the envelope of the tube 30.

Whatever specific arrangements are employed such a low capacity connection aids in ionizing the gas in the tube before the tube fires, and one advantage of merely wrapping one end of the wire 32 around the resistor 17 or other portion of the circuit having a voltage differential with respect to one of the electrodes is that it provides easy adjustability in obtaining the proper capacity connection, since too much capacity results in too great an ionization in the tube so that the tube starts to operate too soon, while with too little capacity or no capacity at all the voltage across the condenser 21 goes too high before the tube fires and then swings too low before the discharge across the tube cuts off, winding on an extra coupling turn, or removing a turn, enabling adjustment of this coupling.

One cathode (the cathode 30c in the drawing) of this modified tube is connected to ground, the anode 30a of the tube is connected to what is here being termed the high voltage (negative with respect to ground) side of the condenser 21 in a manner to be hereafter described, and the other cathode of the tube (the cathode 30b in the drawing) is joined by a capacitive connection comprising a condenser 34 to one of the other electrodes in the tube (the anode 30a as illustrated). The condenser 34 may have a value of .0025 microfarad and acts to stabilize the action of the tube. If this low-value condenser is not provided I have found that the tube discharges down too far before the discharge through the tube cuts off, thereby swinging the voltage across the condenser 21 down several hundred volts below the voltage which it is desired to maintain across said condenser. If the value of the condenser 34 is increased above its proper level in association with the other circuit components the time between when the tube strikes or discharges and when it cuts off gets too long so that again the voltage across the condenser 21 drops as much as a couple of hundred volts. If the cathode 30b is not used in the circuit at all the tube does not fire soon enough, cooperation between the two cathodes 30b and 30c appearing to condition the gas in the tube for the major discharge between the cathode 30c and the anode 30a. As pointed out earlier, one of the electrodes (the anode 30a as illustrated) is connected to the negative side of the condenser 21 through current limiting means in series with said anode. This current limiting means constitutes a resistance-capacity network comprising a resistor 35 and a condenser 36 in parallel. The resistor may have a value of 750,000 ohms, and the condenser 36 should have a value such that the resistance-capacity network has a short time constant. I prefer that the condenser 36 have a value such that the time constant of the network is approximately $1/25,000$ of a second, and it is certainly preferable that such time constant is less than $1/1000$ of a second. Consequently, in the circuit illustrated in the drawing the condenser 36 may have a value of .00005 microfarad.

Without the circuit modification herein described the "Amglo" tube utilized has a rating as a flasher or light source with a strike or discharge voltage of about 975 volts and a cut off voltage of about 585 volts, and the tube normally draws only about 6 milliamperes of current. However, when the tube is inversely connected and used as a voltage regulator in the circuit illustrated it is designed to operate at 2,000 volts, and to maintain the voltage across the condenser 21 constant at about 2,000 volts, except, of course, when the flash bulb 23 is fired. In normal operation when the battery 10 is fresh and has a voltage at least equal to 6 volts the circuit shown takes only about 15 seconds before the condenser 21 charges to 2,000 volts. When the voltage across said condenser reaches approximately 1,000 volts the tube 30 which is connected across said condenser begins to glow with a pink light; as the voltage reaches approximately 1600 or 1700 volts the tube 30 begins to flash occasionally; and when 2,000 or a slightly higher voltage is reached, there is practically a continuous rapidly intermittent flash across the tube 30, holding the voltage across the condenser 21 to within less than 50 volts of the 2,000 volts desired for proper operation of the flash lamp 23. This efficient result is obtained despite the fact that only single wave rectification is provided in the high voltage circuit, and the desired voltage is maintained even when the voltage from the battery 10 drops as low as 3.8 volts under load or 4 volts open circuit. When this occurs, of course, the life of the battery is practically over, but until such battery is almost completely used up the only difference in the operation of my circuit is that a longer charging time is required to obtain the 2,000 volts across the condenser 21. When the battery voltage is down to 3.8 volts the charging time may be approximately 60 seconds, and the flashing across the tube 30 after the condenser is charged cannot be repeated as rapidly as with fresh batteries, but the photographic effect of the flash is still substantially the same.

I have found that when a fresh 6 volt battery is used for the source 10, the current drain is about 1.9 amperes at the start of the charging cycle and 1.4 amperes after the condenser 21 reaches a charge of 2,000 volts. When the battery voltage is down to 3.6 volts, which may occur after about nine hours of continuous use when two 6 volt conventional electric lantern dry cell batteries connected in parallel are used, the current drain is about 1.1 amperes at the start of the charging cycle and about .42 ampere when the condenser is charged. Even with such an exhausted battery I have found that my novel voltage regulator circuit maintains the voltage across the condenser at approximately 1,950 volts.

Fig. 2 comprises a preferred embodiment of my invention, and in said figure circuit components which are similar to those of Fig. 1 are designated by reference characters 40 higher than the characters used in Fig. 1.

In Fig. 2 a battery 50 comprises a source of voltage, one terminal of the battery being connected to ground and the other terminal being connected through a vibrator comprising an inductance 51, a switch 52 and a condenser 53 to the primary 54a of a step-up transformer 54. As in Fig. 1 an on-off switch 55 controls the battery circuit when the movable element of a safety switch 56 is in the position shown in the drawing.

The high voltage circuit includes the transformer secondary 54b, a limiting resistor 57 and a diode rectifier 58, the filament of this diode being supplied with heating current from a battery 59 through a switch 60. An impedance comprising a storage condenser 61 is connected between the high voltage side of the secondary and ground, and a bleeder resistor 62 is in the lead from the high voltage side of the condenser 61 and the transformer secondary to the safety switch 56.

A cable 64 leads from the condenser 61 to a flash lamp 63 and its associated circuit. As in the embodiment earlier described, this circuit comprises a resistor 65, a transformer 66, a resistance-capacity network 67—68 and an operating switch 69.

The voltage regulating apparatus comprises a tube 70 which has at least two electrodes therein and which may be of the same type as the tube 30 of Fig. 1. Said tube is connected in shunt with the impedance 61 and is arranged to pass current whenever a predetermined desired voltage is developed across said impedance, the circuit arrangements associated with the tube providing a means for cutting off said current flow very shortly after it is initiated. As in the apparatus of Fig. 1, this tube may comprise a conventional gas filled device having therein a tortuous tube of glass or other insulating material surrounding the anode and coiled in such manner that the discharge between the anode and a cathode follows the tortuous path defined by the glass tube and travels a distance substantially longer than the straight line distance between said electrodes. As in the apparatus of Fig. 1, the tube 70 is inversely connected in the circuit, its anode 70a being connected to the negative side of the high voltage supply through the resistors 75a and 75b, and one of its cathodes 70c being connected to the positive or grounded side of the high voltage supply. The resistor 75a may have a value of 400,000 ohms, and the resistor 75b may have a value of 150,000 ohms. A condenser 74, which may have a value of .005 microfarad and a voltage rating of 2500 volts is connected between the mid-point of resistors 75a and 75b and the other cathode 70b of the tube 70; and a condenser 76, which may have a value of .0005 microfarad and a voltage rating of 2500 volts is connected between the cathode 70c and the anode 70a.

This voltage regulating circuit comprises two relaxation oscillators, one including the condenser 76 and the tube electrodes 70a and 70c through the tortuous electron path in the tube, and the other including the condenser 74 and the electrodes 70b and 70c. Because of the inverse voltage characteristics of the tube and because of the relatively long gap between the electrodes 70a and 70c caused by the tortuous path in the tube, the relaxation oscillator comprising the condenser 76 and the electrodes 70a and 70c operates only when a predetermined relatively high voltage exists across the electrodes 70a and 70c, as for example a voltage in the neighborhood of 2400 volts. Since the condenser 76 is of a comparatively small value, the time constant of this relaxation oscillator is relatively small, and this circuit will oscillate at a high frequency.

The other relaxation oscillator comprises the condenser 74 and the electrodes 70b and 70c. The electron path between these electrodes follows a straight line and is relatively short, normally in the neighborhood of one-quarter inch, so that the operating voltage of this circuit is only about 1400 volts, and since the condenser 74 is very large as compared with the condenser 76 the frequency of oscillation of this latter circuit is lower than is the frequency of oscillation of the circuit including the condenser 76. As will be apparent from the above description, the difference between the two striking voltages of the respective oscillator circuits is approximately 1,000 volts, and this is the variation that the voltage regulator must handle.

In operation, as the voltage across the storage condenser 61 is gradually building up, a discharge occurs between the electrodes 70b and 70c when a potential difference of 1400 volts across the condenser 61 is reached, and the relaxation oscillator including the condenser 74 and said electrodes operates at its relatively low frequency. The small size of condenser 74 limits the quantity of current during each cycle of oscillation, and consequently the voltage across condenser 61 continues to build up faster than it can be dissipated by this relatively low frequency relaxation oscillator. When the voltage across the storage condenser has increased to about 2400 volts, and at an instant when the relaxation oscillator including condenser 74 is not operating, a discharge occurs between the electrodes 70a and 70c and the other relaxation oscillator including these electrodes and the condenser 76 goes into operation.

As pointed out earlier, this last mentioned relaxation oscillator has a higher operating frequency than the first mentioned oscillator so it operates for a plurality of cycles before the voltage across condenser 74 rises to a high enough level to trigger the lower frequency oscillator. However, at an instant between cycles of the high frequency oscillator the low frequency oscillator again fires to stop operation of the high frequency oscillator. It will be seen that if the high frequency oscillator fires at approximately the voltage which it is desired to maintain across the storage condenser 61, a voltage will never build up across said storage condenser in excess of this value, and it will also be seen that if the low frequency oscillator operates at the proper frequency to stop the high frequency oscillator before the voltage across the condenser 61 has been dissipated by more than a few volts, said voltage across the storage condenser will never fall below a predetermined minimum, but will remain almost constant. When the low frequency oscillator fires it drops the voltage across the circuit components of the other, and stops its operation until the voltage has again built up across the condenser to a point initiating resumption of operation of this latter oscillator effect.

While the circuit of Fig. 2 will operate with most tubes without the modification described in connection with Fig. 1, I have found that with certain tubes the inverse striking voltage is much higher than is normal with most tubes. In this event the tube may be modified by adding a small capacity comprising a condenser 71, a lead 72 and a washer member 73. As in the modification described in connection with Fig. 1, it is not necessary to utilize an actual physical condenser but the capacitive effect may be obtained by affixing a washer 73 to the envelope of the tube 70 and wrapping one end of a lead 72 which extends from the washer around the resistor 57 or some other point in the circuit having a voltage differential with respect to one of the electrodes in the tube 70.

In constructing my voltage regulating circuit for use with high potentials, as 2000 or 2400 volts, I have found that utilizing the inverse voltage characteristics of the tube 70 is important, for if the polarity of the circuit is reversed all regulation stops and the tube will fire and hold until the voltage falls to a very low value. However, by connecting the tube inversely in the circuit a small, inexpensive and readily portable tube may be used to obtain the same high voltage operation for which a very large tube would otherwise be necessary. Furthermore, in constructing the circuit I have found that the value of the condenser 76 is very critical. Since the value of this condenser determines the time constant and the frequency of the high frequency relaxation oscillator circuit, if this condenser is omitted no regulation takes place; if it is made too small, the frequency of its relaxation oscillator circuit is too high and the tube does not regulate well, but will fire and hold until the voltage drops to a very low value. If the condenser is made too large, the frequency of the oscillator is too low, the circuit fires slowly, and too much voltage is dissipated during each relaxation cycle. In either of the latter cases the current through the tube is interrupted for too long or too short a period of time and the voltage is correspondingly raised or lowered in an undesired manner in proportion to the on and off time ratios.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. Apparatus of the character described, including: a circuit including an impedance; a source of voltage for developing a potential across said impedance; a gaseous voltage regulating tube connected in shunt with at least part of said impedance, said tube having at least two electrodes therein; and a low value capacity connection between a point in said circuit having a voltage differential with respect to one of said electrodes and said tube for providing an ionizing effect on the gas within said tube.

2. Apparatus of the character described, including: a circuit including an impedance; a source of voltage for developing a potential across said impedance; a gaseous voltage regulating tube connected in shunt with at least part of said impedance, said tube having an anode electrode and at least one cathode electrode therein and having therein a tortuous electron path for any space current flowing between said anode and cathode electrodes, said path being very substantially longer than the straight line distance between said two electrodes; and a low value capacity connection between said circuit and said tube for providing an ionizing effect on the gas within said tube.

3. Apparatus of the character described, including: an impedance; a source of voltage for developing a potential across said impedance; a voltage regulating tube connected in shunt with at least part of said impedance, said tube having an anode electrode and at least one cathode electrode therein; and a resistance-capacity network connected in series with one of said electrodes.

4. Apparatus of the character described, including: a circuit including an impedance; a source of voltage for developing a potential in said circuit across said impedance; a voltage regulating gaseous tube connected in shunt with at least part of said impedance, said tube having an anode electrode and at least one cathode electrode therein; a capacitive connection between two electrodes of said tube; a low value capacity connection between a point in said circuit having a voltage differential with respect to one of said electrodes and said tube for providing an ionizing effect on the gas within said tube; and a resistance-capacity network having a short time constant and being connected in series with said anode.

5. Apparatus of the character claimed in claim 4, wherein said resistance-capacity network has a time constant not in excess of one one-thousandth of a second.

6. Apparatus of the character claimed in claim 1, wherein said low value capacity connection includes a conducting member located closely adjacent one of the electrodes in said tube.

7. In flash illuminating apparatus having a flash lamp, a condenser for energizing the lamp, and voltage supply means for charging the condenser, voltage regulating means including: a discharge tube connected in shunt with said condenser, said tube having an anode and at least one cathode electrode therein; a capacitive connection between two electrodes of said tube; and means comprising a low value capacity connection between one of said electrodes and a point in said voltage supply means having a voltage differential with respect to one of said electrodes, for providing an ionizing effect on the gas within said tube.

8. In flash illuminating apparatus having a flash lamp, a condenser for energizing the lamp, and voltage supply means for charging the condenser, voltage regulating means including: a discharge tube connected in shunt with said condenser, said tube having an anode and at least one cathode electrode therein; and a resistance-capacity network connected in series with one of said electrodes.

9. In flash illuminating apparatus having a flash lamp, a condenser for energizing the lamp, and voltage supply means for charging the condenser, voltage regulating means including: a gaseous tube connected in shunt with said condenser, said tube having an anode and at least one cathode electrode therein; a capacitive connection between said anode and one cathode electrode; means comprising a low value capacity connection between a point in said voltage supply means having a voltage differential with respect to one of said electrodes and one of said electrodes for providing an ionizing effect on the gas within the tube; and a resistance-capacity network connected in series with said anode, said network having a short time constant.

10. Voltage regulating apparatus of the character described, including: a tube having an anode and at least one cathode electrode; a capacitive connection between said anode and at least one cathode of said tube; a conducting member located closely adjacent an electrode in said tube and adapted to provide a low value capacity connection to said electrode; and a current limiting device connected in series with the anode of said tube.

11. Apparatus of the character described, including: an impedance; a source of voltage for developing a potential across said impedance; a tube connected in shunt with at least part of said impedance; a first relaxation oscillator circuit including said tube, said oscillator circuit being adapted to operate when a predetermined desired voltage is developed across said impedance; and a second relaxation oscillator circuit including said tube, said second oscillator circuit being adapted to operate to terminate operation of said first oscillator circuit very shortly after operation of said first oscillator circuit is initiated.

12. Apparatus of the character described, including: an impedance; a source of voltage for developing a potential across said impedance; a tube connected in shunt with at least part of said impedance, said tube having at least three electrodes therein; a circuit comprising a first relaxation oscillator and including a pair of said electrodes, said oscillator being adapted to operate when a predetermined desired voltage is developed across said impedance; and a circuit comprising a second relaxation oscillator and including another pair of said electrodes, said second oscillator being adapted to operate to terminate operation of said first oscillator very shortly after operation of said first oscillator is initiated.

13. Apparatus of the character described, including: an impedance; a source of voltage for developing a potential across said impedance; a gaseous discharge tube connected in shunt with at least part of said impedance, said tube having at least three electrodes therein; a circuit comprising a first relaxation oscillator and including a pair of said electrodes, said oscillator being adapted to operate when a predetermined desired voltage is developed across said impedance; and a circuit comprising a second relaxation oscillator and including another pair of said electrodes, said second oscillator being adapted to operate to terminate operation of said first oscillator very shortly after operation of said first oscillator is initiated, said circuit arrangements being such that said second oscillator operates at a lower voltage and at a lower frequency than said first oscillator.

14. Apparatus of the character described, including: a circuit including an impedance; a source of voltage for developing a potential across said impedance; a gaseous voltage regulating tube connected in shunt with at least part of said impedance, said tube having an anode electrode and at least one cathode electrode therein and having therein a tortuous electron path for any space current flowing between said anode and cathode electrodes, said path being very substantially longer than the straight line distance between said two electrodes; connections between an anode electrode of said tube and the negative side of said source; connections between a cathode electrode of said tube and the positive side of said source; and a low value capacity connection between said circuit and said tube for providing an ionizing effect on the gas within said tube.

15. Apparatus of the character described, including: an impedance; a source of voltage for developing a potential across said impedance; a gaseous discharge tube connected in shunt with at least part of said impedance, said tube having anode and cathode electrodes therein; connections between an anode electrode of said tube and the negative side of said source; connections between a cathode electrode of said tube and the positive side of said source; a circuit comprising a first relaxation oscillator and including a pair of said electrodes, said oscillator being adapted to operate when a predetermined desired voltage is developed across said impedance; and a circuit comprising a second relaxation oscillator and including another pair of said electrodes, said second oscillator being adapted to operate to terminate operation of said first oscillator very shortly after operation of said first oscillator is initiated, said circuit arrangements being such that said second oscillator operates at a lower voltage and at a lower frequency than said first oscillator.

ARTHUR M. WENGEL.

REFERENCES CITED

The following references are of record in the file of this patent:

UNITED STATES PATENTS

| Number | Name | Date |
|---|---|---|
| 2,250,102 | Klemperer | July 22, 1941 |
| 2,358,796 | Edgerton | Sept. 26, 1944 |
| 2,383,492 | Klemperer | Aug. 28, 1945 |